US008359907B2

(12) United States Patent  (10) Patent No.: US 8,359,907 B2
Lodge et al.  (45) Date of Patent: Jan. 29, 2013

(54) MEASUREMENT OF ROUGHNESS OF A PLAYING SURFACE

(75) Inventors: Timothy P. Lodge, Bingley (GB); Stephen Baker, Bingley (GB)

(73) Assignee: The Sports Turf Research Institute, Bingley (GB)

( * ) Notice: Subject to any disclaimer, the term of this patent is extended or adjusted under 35 U.S.C. 154(b) by 304 days.

(21) Appl. No.: 11/992,560

(22) PCT Filed: Oct. 23, 2006
(Under 37 CFR 1.47)

(86) PCT No.: PCT/GB2006/003954
§ 371 (c)(1),
(2), (4) Date: Aug. 18, 2009

(87) PCT Pub. No.: WO2007/045915
PCT Pub. Date: Apr. 26, 2007

(65) Prior Publication Data
US 2010/0132442 A1  Jun. 3, 2010

(30) Foreign Application Priority Data
Oct. 22, 2005 (GB) .................................. 0521604.9

(51) Int. Cl.
*G01B 5/28* (2006.01)
(52) U.S. Cl. ........................................................ 73/105
(58) Field of Classification Search .................. None
See application file for complete search history.

(56) References Cited

U.S. PATENT DOCUMENTS

| | | | |
|---|---|---|---|
| 3,882,607 A | 5/1975 | Plasser et al. | |
| 4,084,324 A * | 4/1978 | Whitehouse | 33/504 |
| 4,158,258 A * | 6/1979 | McKechnie | 33/521 |
| 4,184,270 A * | 1/1980 | Presbrey | 434/151 |
| 4,754,971 A * | 7/1988 | Kobayashi | 473/290 |
| 5,774,374 A | 6/1998 | Scott et al. | |
| 6,446,005 B1 * | 9/2002 | Bingeman et al. | 701/215 |
| 6,782,631 B1 | 8/2004 | Face | |
| 7,712,355 B2 * | 5/2010 | Takanashi | 73/105 |
| 2002/0073566 A1 | 6/2002 | Suzuki et al. | |
| 2005/0145011 A1 * | 7/2005 | Pelz | 73/9 |

FOREIGN PATENT DOCUMENTS

| | | | |
|---|---|---|---|
| DE | 3925133 C1 | 12/1990 | |
| DE | 42 13 222 | * 10/1993 | |
| GB | 451010 A | 7/1936 | |
| GB | 1402057 A | 8/1975 | |

* cited by examiner

*Primary Examiner* — Robert R Raevis
(74) *Attorney, Agent, or Firm* — Harness, Dickey & Pierce, P.L.C.

(57) ABSTRACT

A device (60) and method for measuring the roughness of a playing surface are described. The device includes a carriage (12) which can travel over the playing surface, a rotatable member (80) which can roll over the playing surface, a restraint (84) which constrains the rotatable member (80) to travel with the carriage (12) and a transducer (70) coupled to the rotatable member (80) and which can generate a signal representative of the height and/or lateral translation of the rotatable member.

29 Claims, 2 Drawing Sheets

MEASUREMENT OF ROUGHNESS OF A PLAYING SURFACE

CROSS-REFERENCE TO RELATED APPLICATIONS

This application is a 371 National Stage of International application No. PCT/GB2006/003854, filed Oct. 23, 2006 and published in English as WO 23007/045915 A1 on Apr. 26, 2007. This application claims the benefit of GB 0521604.9, filed Oct. 22, 2005. The disclosure of the above applications are incorporated herein by reference.

The present invention relates to measuring surfaces, and in particular to methods and apparatus for measuring the roughness of playing surfaces.

The condition of a playing surface can have an impact on the sport or game played on that surface. For example, the hardness of a playing surface will have an effect on the bounce or rebound of a ball landing on the surface. Similarly, the condition of a playing surface, such as the amount of grass on parts of a football pitch, will have an impact on the way a football travels over the pitch. Similarly the type of grass, length of grass and the way the grass has been cut, can have an impact on the way a golf ball will travel over various parts of a golf course.

In general, it is known that the slope of a playing surface will effect how a ball will travel over the surface, and in some games is a part of the game, for example crown green bowling. However, little attention, if any, has been paid to the effect that the roughness of a playing surface has on a ball travelling over it.

The present invention therefore provides apparatus and methods for measuring the roughness of a playing surface.

The measured roughness can be used, for example, to categorise the surface, for example, whether it is fit for play or meets certain criteria for an event. The measured roughness can be used to determine the wear of the playing surface. The measured roughness can be used to help assess the suitability of the composition of the playing surface for a particular game or sport, for example the type of grass or soil. Hence, quantitative information about the roughness of a playing surface will be of use in the building, management, maintenance and use of playing surfaces and to the organisers of sporting and games events.

According to a first aspect of the present invention, there is provided a playing surface roughness measuring device. The device can include a carriage-mounted on a plurality of surface engaging members by which the device can travel over a playing surface to be measured. A rotatable member is contactable with the playing surface to roll thereover in use. A restraint can constrains the rotatable member to travel with the carriage. A transducer or measuring device can be coupled to the rotatable member and which can generate a signal representative of the height and/or lateral movement of the rotatable member.

Hence, by measuring the variations in height and/or lateral movement of a member rolling over the playing surface, a more accurate and/or quantitative measure or indication of the roughness of the playing surface can be generated.

The rotatable member can be a ball or a sphere. The rotatable member can be a part of a ball or sphere, such as a strip around the circumference of the ball or sphere.

The ball or sphere can have some or all of the same properties as a ball used in a game normally played on the playing surface. The properties can include the size, mass, density, surface, material or any other physical property of the ball normally used on the playing surface.

An arrangement of the rotatable member and part of the transducer or measuring device preferably have a mass substantially the same as the mass of a ball normally used to play on the playing surface. Hence, the measured behaviour of the rotatable member will be closer to that of an actual ball.

The playing surface can be a green of a golf course. The ball can be a golf ball.

The surface engaging members can comprise a plurality of rotatable members. The rotatable members can be various types of rotatable members, such as wheels, rollers, tracks and similar.

A plurality of wheels can be used arranged on a plurality of bogies. Each bogey can be independently movable. The ground engaging members can be movable and/or pivotable to adapt to variations in the playing surface over which the device travels.

The device can further comprise a roller mounted on a pivotable arm. The roller can engage an upper surface of the rotatable member. The transducer can be coupled to the pivotable arm. A resilient biasing means can also be provided and which acts to urge the roller toward the upper surface of the rotatable member.

The device can further comprise a device for determining the speed of the carriage over the surface. This allows the profile of the playing surface to be recreated.

The signal can be representative of the height of the rotatable member.

The signal can be representative of lateral translation of the rotatable member.

The restraint can includes a pivot mechanism which allows the rotatable member to move laterally relative to the direction of travel of the device.

The transducer can generate no additional friction. Preferably, the transducer is or includes an optical encoder or encoders.

The device can include a data logging apparatus for logging data obtained from a signal generated by the transducer.

The data logging apparatus can be programmed to calculate a quantitative measure of the roughness of the playing surface.

According to a further aspect of the invention, there is provided a method for determining the roughness of a playing surface. A carriage can be propelled over the playing surface. A rotatable member can be engaged with the playing surface as the rotatable member is carried along by the carriage over the playing surface. Any variations in the height and/or lateral translation of the rotatable member can be measured as the rotatable member rolls over the playing surface.

The method can also include measuring the speed of rotation of the rotatable member.

An embodiment of the invention will now be described, by way of example only, and with reference to the accompanying drawings, in which.

Figure 1:
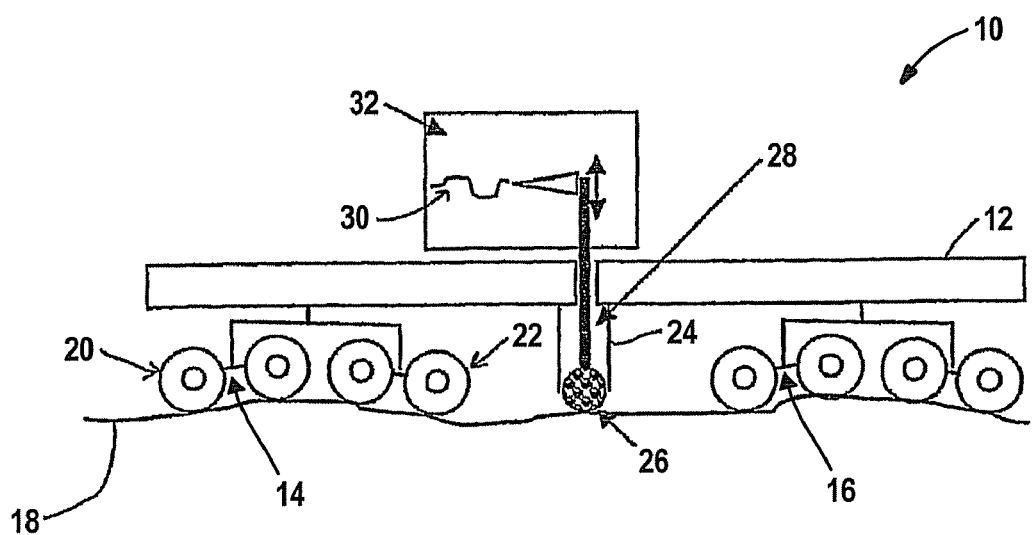
FIG. 1 shows a schematic illustration of a first roughness measuring device according to the present invention.

Similar items in different Figures share common reference numerals unless indicated otherwise.

The invention will be described below in connection with golf and measuring the roughness of a putting green. However, it will be appreciated that the invention is not limited to that application and can be used in connection with any playing surface over which a ball will typically role in use. Examples include, a bowling green, a hockey pitch, a polo pitch, a football pitch and similar.

With reference to FIG. 1 there is shown a first embodiment of a roughness measuring device 10 according to the invention. The playing surface roughness measuring device 10 includes a body or carriage portion 12 having a first bogey arrangement 14 at a first end and a second bogey arrangement 16 at a second end thereof. Each bogey arrangement 14, 16 comprises two sets of four wheels providing ground engaging members by which the device 10 can travel over a playing surface 18. A first 20 and second 22 set of four wheels are pivotably attached to a main part of the bogey arrangement 14, 16 to which the carriage 12 is attached. The first and second sets of wheels 20, 22 can pivot relative to the carriage 12 in order to adapt to local variations in the profile of the playing surface 18 so as to generally maintain the carriage 12 in a substantially constant attitude relative to the playing surface 18. The pivotable bogeys help to reduce the effect of movement of the carriage owing to the roughness of the ground so that a more accurate measurement of the surface roughness can be achieved.

Toward the middle of the carriage there is a downwardly extending circular cylinder 24 and a ball 26 located in an open end of the cylinder 24. The ball 26 has substantially the same shape, size and mass as a conventional golf ball. The cylinder 24 has a diameter slightly larger than that of the ball 26 so that the ball can freely rotate therein. The location of the free end of cylinder 24 is selected so as to prevent the ball 26 from escaping from the free end of the cylinder so that the cylinder 24 constrains the ball 26 to follow the movement of the device 10 as it travels along the playing surface 18. The cylinder therefore provides a restraining device which allows the ball to rotate while causing the ball to travel along with the carriage.

A part of a transducer 28 engages with an upper surface of ball 26 thereby coupling the transducer to the ball. The transducer 28 is sensitive to vertical displacement of the ball 26 relative to the carriage 12 caused by variations in the height of the playing surface 18. The transducer 28 converts vertical displacement of the ball 26 into an electrical signal 30 which is recorded and stored by data logging circuitry 32.

In use, the device 10 can be used to determine a measure of the roughness of the playing surface 18. The device 10 can be driven by a motor, pulled, or otherwise propelled across the playing surface to be measured. As the wheels of the device encounter variations in the height of the surface, the bogeys pivot so as to compensate to some extent for the variations in the height of the surface. Ball 26 is constrained by the restraining deice 24 to follow the path of the roughness measuring device 10 and to roll freely over playing surface 18. As the ball encounters variations in height of the playing surface the upper surface of the ball urges against transducer part 28 causing a signal to be generated representative of the current height of the ball, or expressed differently, the ball's vertical displacement relative to the carriage 12. As the ball descends, transducer member 28 falls under the action of gravity to maintain contact with the upper surface of the ball.

The transducer generates an output signal 30 indicative of the current height of the ball at any position along the path travelled by the device 10 over the playing surface. The height data is logged by the data logging circuitry 32 and can be processed to provide various measures of the roughness of the playing surface, such as a roughness coefficient, the standard deviation of the height of the ball, the mean height of the ball or any other measure, statistical or otherwise, indicative of the roughness of the surface and which can be derived from the stored height information.

Figure 2:
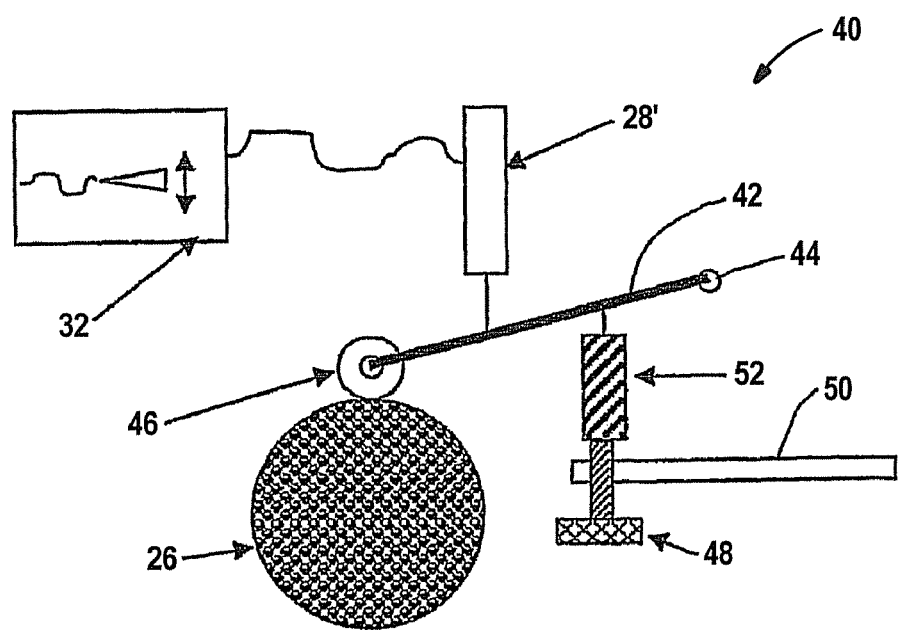
FIG. 2 shows a schematic illustration of an alternate transducer arrangement part of the device shown in FIG. 1.

FIG. 2 shows an alternative arrangement of the transducer and ball arrangement of the device 10 which can be used in an alternate embodiment. The alternate transducer arrangement 40 includes an arm 42 which is connected by a pivot mechanism 44 to a part of the carriage 12. A roller 46 is rotatably mounted on a free end of arm 42 and engages an upper part of the surface of ball 26. A screw fastener 48 passes through a threaded hole in a part 50 of the carriage. A spring 52, or other resilient biassing means, is attached between a free end of screw fastener 48 and the arm 42. A movable part of transducer 28' is coupled to pivotable arm 42.

In use, as the ball 26 rotates within cylinder 24, which has an aperture cut therein to receive arm 42, roller 46 rotates against the surface of the ball 26. As the ball 26 travels over bumps in the playing surface, arm 42 pivots about pivot 44 and transducer 28' is actuated accordingly. Spring 52 applies a biassing force to arm 42 in order to maintain engagement between the roller 46 and the upper surface of ball 26 as the ball moves downwardly.

Screw 48 can be actuated to increase or decrease the biassing force applied to pivotable arm 42 by advancing or retreating relative to part 50.

Figure 3:
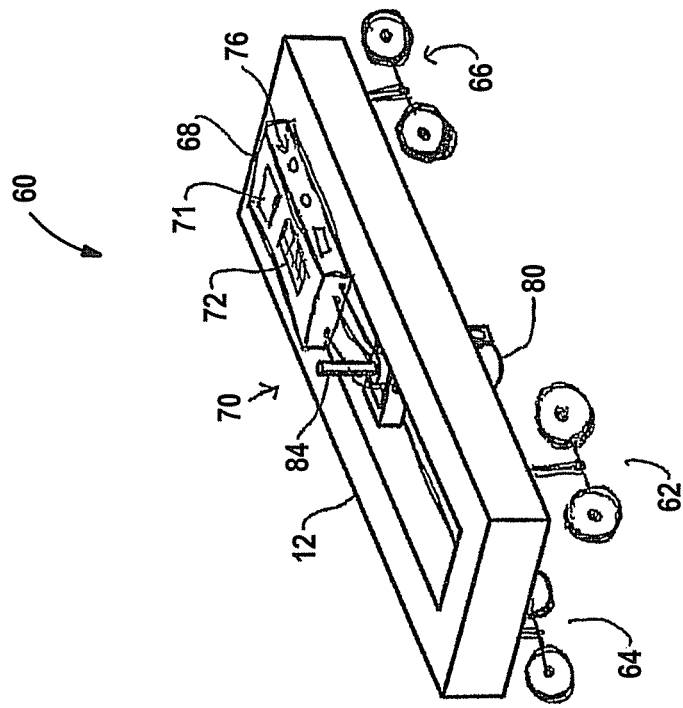
FIG. 3 shows a schematic perspective illustration of a second roughness measuring device according to the present invention.
Figure 4:
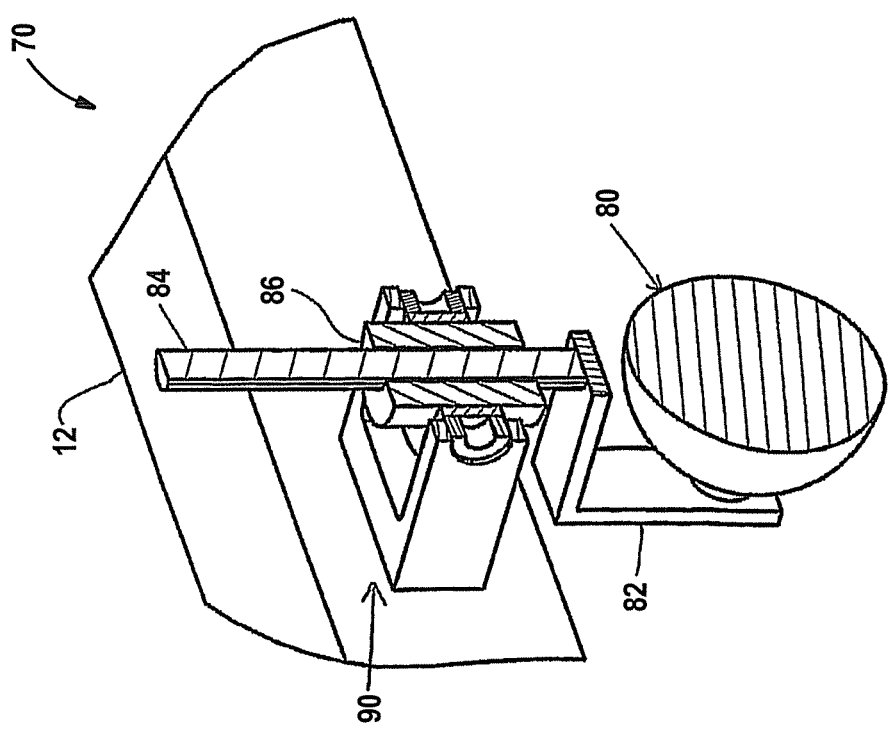
FIG. 4 shows a schematic cross section through a transducer arrangement part of the device shown in FIG. 3.

With reference to FIGS. 3 and 4 there is shown a further embodiment of a playing surface roughness measuring device 60 also according to the present invention. FIG. 3 shows a schematic perspective diagram of the device and FIG. 4 shows a partial cross-section through a roughness measuring part 70 of the device.

As illustrated in FIG. 3, the device includes a main body or carriage 12 in the form of a substantially rectangular frame. A transducer arrangement 70, as illustrated in greater detail in FIG. 4, is positioned within the centre of the frame. A bogey arrangement 62, 64, 66 is provided at each corner of the device (with the fourth bogey not visible in FIG. 3). Each bogey arrangement 62, 64, 66 comprises a pair of wheels rotatably mounted on a member which s pivotable with respect to the carriage 12.

A signal processing and data logging apparatus 68 is provided on the carriage and includes a screen 71 for displaying information and a keyboard or keypad 72 allowing the device to be programmed and/or controlled. The data logging apparatus 68 also includes various ports and interfaces 74 by which data, information and instructions can be downloaded from the device, or uploaded to the device, and by which data storage media can be inserted and removed from the device.

The data logging apparatus 68 receives signals via three wires from three transducers associated with the transducer arrangement 70, as will be described in greater detail below. An analogue to digital converter converts the received transducer signals into digital values which are processed under the control of a microprocessor, microcontroller or similar device, and then stored in a data storage device, such as flash memory or other suitable storage medium, such as a micro hard disk drive. The microcontroller or microprocessor can also be programmed via onboard instructions to analyse the stored data to determine quantitative measures of the roughness of the playing surface, as described previously, such as a roughness co-efficient, standard deviation of the height of the playing surface, mean value of the height of the playing surface, average values of the height of the playing surface or any other metric representative of the roughness of the playing surface.

FIG. 4 shows a partial cross-sectional diagram through the transducer arrangement 70 in greater detail. A spherical ball 80 is mounted within a yoke 82 which has a member 84 extending therefrom. Ball 80 is pivotally attached between the members of the yoke 82 and includes an optical encoder arrangement (not shown) which, in use, can supply a signal representative of the speed of rotation of ball 80.

Member 84 passes through an aperture in a sleeve part 86 of a one degree of freedom gimbal arrangement 90. Member 84 is free to slide relative to sleeve 86 and a second optical encoder (not shown) can generate a signal representative of the displacement of member 84 within sleeve 86 providing a signal indicative of the height of the ball 80.

Sleeve 86 is pivotally mounted to provide a half gimbal arrangement (i.e. having only one pivotable degree of freedom rather than two pivotable degrees of freedom) to allow transverse or lateral movement of the ball 80. A third optical encoder (not shown) is provided to determine the degree of pivot or rotation of the sleeve 86.

As indicated above, the signals from the three optical encoders are communicated via wires to the data logging apparatus 68 where the signals are processed and data representing the speed of ball 80, vertical displacement of ball 80 and lateral displacement of ball 80 is stored for display and/or further processing either by data logging apparatus 68 or another device subsequently.

Optical encoders are preferred as part of the transducer arrangement 70 as they have very little or no friction and so allow a truer representation of movement of ball 80 to be generated.

It is preferred if the total mass of the ball, yoke 82 and member 84 correspond generally to the total mass of a golf ball so that the transducer arrangement 70 will more accurately reflect the actual performance of a standard golf ball.

Providing a horizontal or lateral degree of freedom allows the ball 80 to more closely follow the track that a golf ball would follow thereby giving a more accurate representation of the roughness of the playing surface that the ball would experience.

Measuring the speed and/or rotation of the ball allows the actual profile of the surface to be reproduced from the recorded data as it is possible to correlate the vertical and/or lateral displacement of the ball with its position along the path it has travelled over the playing surface.

In an alternate embodiment, not shown, the ball 80 is not spherical but rather comprises a rim on a central hub in which the rim corresponds to a ground engaging strip around the circumference of the ball rather than the entire surface of the ball.

In a further alternate embodiment, the ball 80 is not located toward the centre of the carriage but rather is attached toward a rear end of the carriage so that the ball is dragged over the playing surface. The transducer arrangement is similar to that shown in FIG. 4 except that a true gimbal arrangement is used providing two pivoting degrees of freedom and the yoke 82 is not permitted to slide relative to the gimbal arrangement. A first degree of freedom of the gimbal arrangement allows variation in the height of the ball and the second degree of freedom of the gimbal arrangement provides for lateral translation of the ball, with two optical encoders to generate signals representative of the vertical and lateral displacement of the ball.

It will be appreciated that the device described herein can be modified and adapted in various ways and that various of the features shown in different figures can be combined in order to arrive at different embodiments of the invention.

The invention claimed is:

1. A grass playing surface roughness measuring device, comprising:
   a carriage mounted on a plurality of surface engaging members by which the device can travel over a grass playing surface to be measured, wherein the surface engaging members comprise a plurality of wheels;
   a rotatable member contactable with the grass playing surface to roll thereover in use;
   a restraint which constrains the rotatable member to travel with the carriage;
   a transducer mounted on the carriage and coupled to the rotatable member and which can generate a signal representative of translation of the rotatable member relative to the carriage, wherein the rotatable member is a sphere or a strip of the surface of a sphere extending around the circumference of the sphere; and
   a plurality of bogey arrangements coupling the plurality of wheels to the carriage, the plurality of bogey arrangements being independently movable to adapt to variations in the grass playing surface over which the device travels so as to generally maintain the carriage in a substantially constant attitude relative to the playing surface.

2. A device as claimed in claim 1, wherein the rotatable member has one, some or all of the same properties as a ball used in a game normally played on the grass playing surface.

3. A device as claimed in claim 2, wherein the grass playing surface is a green of a golf course and the ball is a golf ball.

4. A device as claimed in claim 2, wherein said same properties include the size, mass, density, surface or material of said ball used in said game normally played on the grass playing surface.

5. A device as claimed in claim 1, further comprising a device for determining the speed of the carriage over the surface.

6. A device as claimed in claim 1, wherein the signal is representative of the height of the rotatable member.

7. A device as claimed in claim 1, wherein the restraint includes a pivot mechanism which allows the rotatable member to move laterally relative to the direction of travel of the device.

8. A device as claimed in claim 1, further comprising a data logging apparatus for logging data obtained from said signal generated by the transducer.

9. A device as claimed in claim 8, wherein the data logging apparatus is programmed to calculate a quantitative measure of the roughness of the playing surface.

10. A method for determining the roughness of a grass playing surface, comprising:
    propelling a carriage over the grass playing surface;
    engaging a rotatable member with the grass playing surface as the rotatable member is carried along by the carriage over the grass playing surface; and
    measuring any variations in the vertical movement and the lateral movement of the rotatable member as it rolls over the grass playing surface.

11. A method as claimed in claim 10, wherein said grass playing surface is a part of a golf course.

12. A method as claimed in claim 10, wherein said rotatable member has one, some or all of the same properties as a golf ball.

13. A method as claimed in claim 10, wherein said rotatable member is a sphere or a strip of the surface of a sphere extending around the circumference of the sphere.

14. A method as claimed in claim 10, further comprising calculating a quantitative measure of the roughness of the grass playing surface.

15. A grass playing surface roughness measuring device, comprising:
- a carriage mounted on a plurality of surface engaging members by which the device can travel over a grass playing surface to be measured;
- a rotatable member contactable with the grass playing surface to roll thereover in use;
- a restraint which constrains the rotatable member to travel with the carriage and which allows the entire rotatable member to move laterally relative to a direction of travel of the device so as to follow a track that a ball would follow; and
- a first transducer mounted on the carriage and coupled to the rotatable member and which can generate a signal representative of the lateral movement of the entire rotatable member relative to the carriage.

16. A device as claimed in claim 15, wherein the rotatable member is a sphere or a strip of the surface of a sphere extending around the circumference of the sphere.

17. A device as claimed in claim 15, wherein the rotatable member has one, some or all of the same properties as a ball used in a game normally played on the grass playing surface.

18. A device as claimed in claim 17, wherein said same properties include the size, mass, density, surface or material of said ball used in said game normally played on the grass playing surface.

19. A device as claimed in claim 15, wherein the grass playing surface is a green of a golf course and the ball is a golf ball.

20. A device as claimed in claim 15, wherein the surface engaging members comprise a plurality of wheels.

21. A device as claimed in claim 20, further comprising a plurality of bogey arrangements coupling the plurality of wheels to the carriage, the plurality of bogey arrangements being independently movable to adapt to variations in the grass playing surface over which the device travels so as to generally maintain the carriage in a substantially constant attitude relative to the playing surface.

22. A device as claimed in claim 15, further comprising a device for determining the speed of the carriage over the grass playing surface.

23. A device as claimed in claim 15, wherein the restraint allows the rotatable member to move vertically relative to the direction of travel of the device and a second transducer is mounted on the carriage and coupled to the rotatable member and which can generate a signal is representative of the vertical movement of the rotatable member.

24. A device as claimed in claim 15, wherein the restraint includes a pivot mechanism which allows the entire rotatable member to move laterally relative to the direction of travel of the device.

25. A device as claimed in claim 15, wherein the transducer includes an optical encoder.

26. A device as claimed in claim 15, further comprising a data logging apparatus for logging data obtained from said signal generated by the transducer.

27. A device as claimed in claim 26, wherein the data logging apparatus is programmed to calculate a quantitative measure of the roughness of the grass playing surface.

28. A grass playing surface roughness measuring device, comprising:
- a carriage mounted on a plurality of surface engaging members by which the device can travel over a grass playing surface to be measured;
- a rotatable member contactable with the grass playing surface to roll thereover in use;
- a restraint which constrains the rotatable member to travel with the carriage; and
- a transducer mounted on the carriage and coupled to the rotatable member and which can generate a signal representative of translation of the rotatable member relative to the carriage, wherein the rotatable member is a sphere or a strip of the surface of a sphere extending around the circumference of the sphere, wherein the signal is representative of lateral translation of the rotatable member.

29. A grass playing surface roughness measuring device, comprising:
- a carriage mounted on a plurality of surface engaging members by which the device can travel over a grass playing surface to be measured;
- a rotatable member contactable with the grass playing surface to roll thereover in use;
- a restraint which constrains the rotatable member to travel with the carriage; and
- a transducer mounted on the carriage and coupled to the rotatable member and which can generate a signal representative of translation of the rotatable member relative to the carriage, wherein the rotatable member is a sphere or a strip of the surface of a sphere extending around the circumference of the sphere, wherein the transducer includes an optical encoder.

* * * * *